(No Model.)
G. MÜLLER.
INFANT'S FEEDING BOTTLE.
No. 535,550. Patented Mar. 12, 1895.
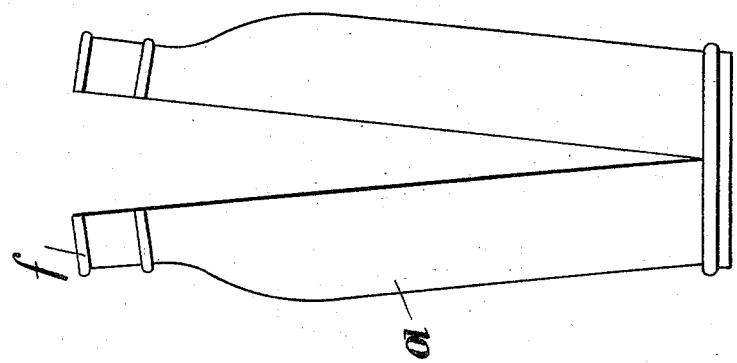
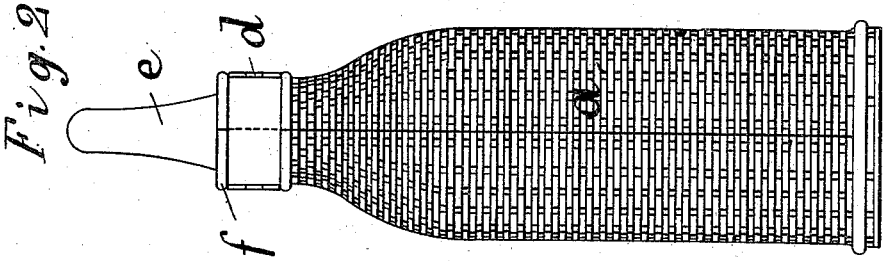
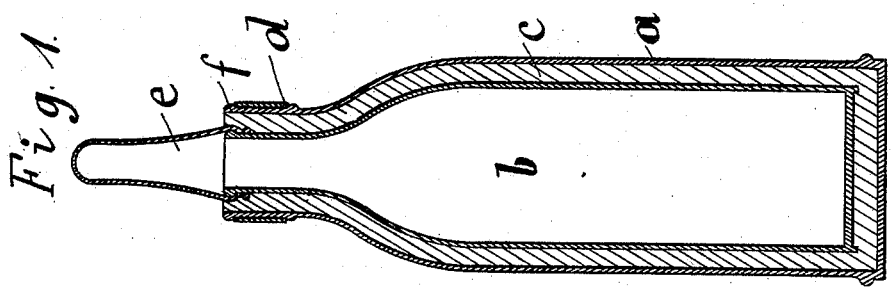
WITNESSES:
E. K. Sturtevant
H. van Oedenneel
INVENTOR
Gustav Müller
BY
Reunrds
ATTORNEYS.
THE NORRIS PETERS CO., PHOTO-LITHO., WASHINGTON, D. C.

UNITED STATES PATENT OFFICE.

GUSTAV MÜLLER, OF GOERLITZ, GERMANY.

INFANT'S FEEDING-BOTTLE.

SPECIFICATION forming part of Letters Patent No. 535,550, dated March 12, 1895.

Application filed July 10, 1894. Serial No. 517,098. (No model.) Patented in Germany June 28, 1894, No. 76,899.

*To all whom it may concern:*

Be it known that I, GUSTAV MÜLLER, a subject of the King of Prussia, German Emperor, residing at Goerlitz, in the Province of Silesia, Germany, have invented certain new and useful Improvements in Infants' Feeding-Bottles, of which the following is a specification.

This invention has been patented in Germany under No. 76,899, dated October 27, 1893, granted June 28, 1894.

The use of an ordinary feeding bottle for infants, is attended with the great disadvantage that it is easily broken, so that an infant using it, especially when left alone is liable to serious injury. Moreover the contents of the bottle very quickly become cold, when they may be seriously injurious to the health of the child. A third objection is that the india rubber nipple easily comes off the neck of the bottle, so that the contents of the latter run out. These objections are entirely met, in a very simple way by the improvements which form the subject of the present invention.

In the accompanying drawings, Figure 1 is a vertical section through my feeding bottle. Fig. 2 is a view thereof and Fig. 3 shows the protecting cover.

Similar reference-letters indicate similar parts throughout the drawings.

The protecting arrangements for the bottle $b$ consist essentially of a cover $a$ of a suitable material such as plaited straw, cork, leather, or the like.

In order that the bottle may be easily taken out or replaced in this cover, the latter is made in two sections separated by a vertical division (Fig. 3) and made to fit the bottle when closed but attached to the bottom of the cover.

A space left between the bottle $b$ and the covering $a$ is filled with a material non-conductive of heat such as felt, cork, or the like, so that the contents of the bottle are kept warm for a long time.

When the bottle is inserted into the covering, the upper ends of the latter are closed and are held together by a suitable ring $d$ which is prevented from falling out, by a flange $f$ of the covering. In this manner the india rubber nipple $e$ fitted over the neck of the bottle is held in place, so as to prevent the nipple from coming off the neck of the bottle. In this way the bottle is prevented from leaking, which heretofore has been a great disadvantage.

Having now particularly described and ascertained the nature of my said invention and in what manner the same is to be performed, I declare that what I claim is—

1. In combination in an infant's feeding bottle, the inner bottle, the nipple thereon and the two part protecting case inclosing the bottle and clamped around the nipple to hold the same in place, said nipple being exposed above the said clamped portion substantially as described.

2. In combination the bottle, the nipple thereon the two part inclosing casing and the clamp embracing the upper ends of the said parts of the casing on the outside of the bottle neck said nipple being exposed above the said clamp, substantially as described.

Signed at Zittau, in the Kingdom of Saxony, Germany, this 12th day of May, in the year 1894.

GUSTAV MÜLLER.

Witnesses:
 EDMUND W. BRÖCHTER,
 GUSTAV FÄHRMANN, Jr.